United States Patent
Brown et al.

(10) Patent No.: US 7,012,233 B2
(45) Date of Patent: Mar. 14, 2006

(54) THRUST VECTORING A FLIGHT VEHICLE DURING HOMING USING A MULTI-PULSE MOTOR

(75) Inventors: Charles C. Brown, Coppell, TX (US); Philip T. Beyer, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 152 days.

(21) Appl. No.: 10/206,563

(22) Filed: Jul. 26, 2002

(65) Prior Publication Data

US 2004/0124306 A1 Jul. 1, 2004

Related U.S. Application Data (60) Provisional application No. 60/389,944, filed on Jun. 19, 2002.

(51) Int. Cl.
*F41G 7/00* (2006.01)

(52) U.S. Cl. .................. 244/3.1; 89/1.813; 89/1.814; 60/204; 244/62; 244/53 R; 244/73 R (58) Field of Classification Search ............. 60/204; 244/3.1, 62, 53 R, 73 R, 172; 89/1.813, 1.814
See application file for complete search history.

(56) References Cited

U.S. PATENT DOCUMENTS

| | | | |
|---|---|---|---|
| 4,357,795 A | | 11/1982 | Bastian et al. ............... 60/204 |
| 4,829,765 A | * | 5/1989 | Bolieau et al. ............... 60/250 |
| 4,972,673 A | | 11/1990 | Carrier et al. ............... 60/245 |
| 5,419,118 A | * | 5/1995 | McSpadden et al. .......... 60/250 |
| 5,675,966 A | * | 10/1997 | Dombrowski et al. ........ 60/204 |
| 5,931,414 A | * | 8/1999 | Grosse ........................ 244/62 |
| 6,138,945 A | | 10/2000 | Biggers et al. ............ 244/3.22 |
| 6,462,322 B1 | * | 10/2002 | Gauggel et al. ............. 244/3.1 |

FOREIGN PATENT DOCUMENTS

| | | |
|---|---|---|
| EP | 0 364 086 | 4/1990 |
| FR | 2 813 923 | 3/2002 |

OTHER PUBLICATIONS

International Search Report dated May 18, 2004 (PCT US 03 09656; 2063.004310).

* cited by examiner

*Primary Examiner*—J. Woodrow Eldred
(74) *Attorney, Agent, or Firm*—Williams, Morgan & Amerson, P.C.

(57) ABSTRACT

A method and apparatus for thrust vectoring a flight vehicle during homing are disclosed. The flight vehicle includes a body; a plurality of attitude control mechanisms on the body; a multi-pulse motor housed at least partially in the body; and a control unit housed in the body. The control unit generates signals controlling an actuation of the attitude control mechanisms and the multi-pulse motor to initiate a follow-on burn of the multi-pulse motor to effect a maneuver directed by the actuation of the attitude control mechanisms. The method includes conserving a second burn of a dual pulse motor until target acquisition; acquiring a target; actuating a attitude control mechanism for the flight vehicle to alter the flight vehicle's heading; and initiating the second burn.

57 Claims, 6 Drawing Sheets

THRUST VECTORING A FLIGHT VEHICLE DURING HOMING USING A MULTI-PULSE MOTOR

This application claims the benefit of provisional application Ser. No. 60/389,944 filed Jun. 19, 2002.

BACKGROUND OF THE INVENTION

1. Field of the Invention

The present invention pertains to control of a motorized flight vehicle in a medium and, more particularly, to thrust vectoring a flight vehicle during homing using a dual pulse solid rocket motor.

2. Description of the Related Art

Flight vehicles such as missiles find a wide range of very demanding applications. They are frequently employed in many different scenarios with varying degrees of lethality. These scenarios may range from non-lethal missions to the delivery of an explosive payload to disable, or even destroy, a target. Because of this potential lethality, much consideration is devoted to the design of such flight vehicles to achieve optimal performance. Optimal performance, however, can be an elusive goal. The primary reason for this reality is that the technical solutions for any one characteristic may adversely impact other performance characteristics.

Figure 1:
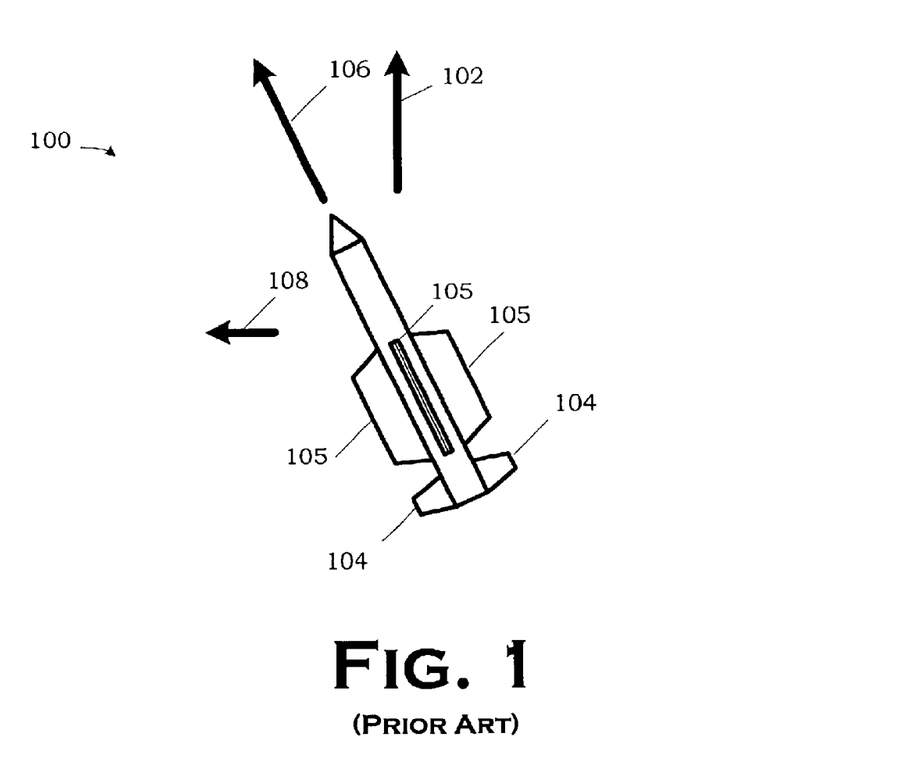
FIG. 1 illustrates some concepts implicated in the maneuverability of a conventional, prior art flight vehicle such as a missile.

Consider, for instance, speed and maneuverability. In missiles, designers favor the use of small fins, or control surfaces, because they reduce weight and drag, thereby increasing speed. Small fins, however, adversely impact maneuverability because they do not provide as much lift as larger fins. FIG. 1 illustrates a conventional approach to turning a missile 100. The missile 100, traveling on a flight path (represented by the arrow 102), activates its control surfaces (typically, one or more of the fins 104). This changes the orientation, or attitude, of the missile 100 relative to the flight path 102 in the direction of the desired flight path (represented by the arrow 106).

However, the missile 100 continues traveling in the direction of the current flight path 102 even though it is oriented toward the desired flight path 106 due to momentum. The new attitude generates lift on the fixed fins 105 that eventually forces the missile from the current flight path 102 to the desired flight path 106. Larger, heavier fins 105 increase the amount lift exerted on the missile 100. Thus, larger and heavier fins 105 produce greater maneuverability. They nevertheless increase weight and drag, thereby reducing speed. This conundrum becomes more troublesome at high altitudes where thin atmospheres hamper the ability to generate lift adequate to quickly alter the flight path of the missile 100.

In many high performance flight vehicles maneuverability is a prized performance characteristic. Such flight vehicles frequently are fired at targets that are themselves highly maneuverable. The targets, understandably, seldom wait for the flight vehicle and try to evade it. This is a much greater concern to the flight vehicle as it approaches the target because shorter distances yield shorter reaction times. Sometimes, these flight vehicles are themselves fired upon. In these situations, maneuverability may be desired to help evade the weapon fired at them. Designers frequently choose larger fins for greater maneuverability over small fins for speed in these types of flight vehicles.

One attempt to compensate for these kinds of tradeoffs experiments with motor technologies. Rocket motors may be categorized in a number of ways, e.g., by whether they employ solid fuel or liquid fuel. Traditionally, solid rocket motors burned in stages, and once per stage. Submarine-based ICBMs are classic examples of this technology. More recently, some rockets have employed what are known as "dual pulse" motors that burn twice per stage, although their practical applications are still relatively rare. The Boeing Company's AGM-69-A Short Range Attack Missile ("SRAM") II and Lockheed Martin Corporation's Javelin shoulder launched missile systems are examples. Dual pulse motors have been found useful in improving range, alleviating thermal problems, and achieving higher end speed. Conventional uses of dual pulse motors cause other problems, however. For example, the increased high end speed exacerbates the problem of decreased reaction time.

Another approach to providing terminal maneuverability is to provide what are known as "divert motors." Divert motors are essentially side facing thrusters. The principal consequence of the divert motors is to move the missile 100 sideways, bodily, relative to the current heading 102, as represented by the arrow 108. Divert motors are a separate system that can cause complications, such as difficulty in integrating into the control systems of the missile 100. The divert motors also add cost and weight to the missile 100, and generally decrease the reliability of the overall missile system.

The present invention is directed to resolving, or at least reducing, one or all of the problems mentioned above.

SUMMARY OF THE INVENTION

The present invention, in its various aspects and embodiments, includes method and apparatus for thrust vectoring a flight vehicle during homing. The flight vehicle comprises a body; a plurality of attitude control mechanisms on the body; a multi-pulse motor housed at least partially in the body; and a control unit housed in the body. The control unit generates signals controlling an actuation of the attitude control mechanisms and the multi-pulse motor to initiate a follow-on burn of the multi-pulse motor to effect a maneuver directed by the actuation of the attitude control mechanisms. The method comprises conserving a second burn of a dual pulse motor until target acquisition; acquiring a target; actuating a attitude control mechanism for the flight vehicle to alter the flight vehicle's heading; and initiating the second burn.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
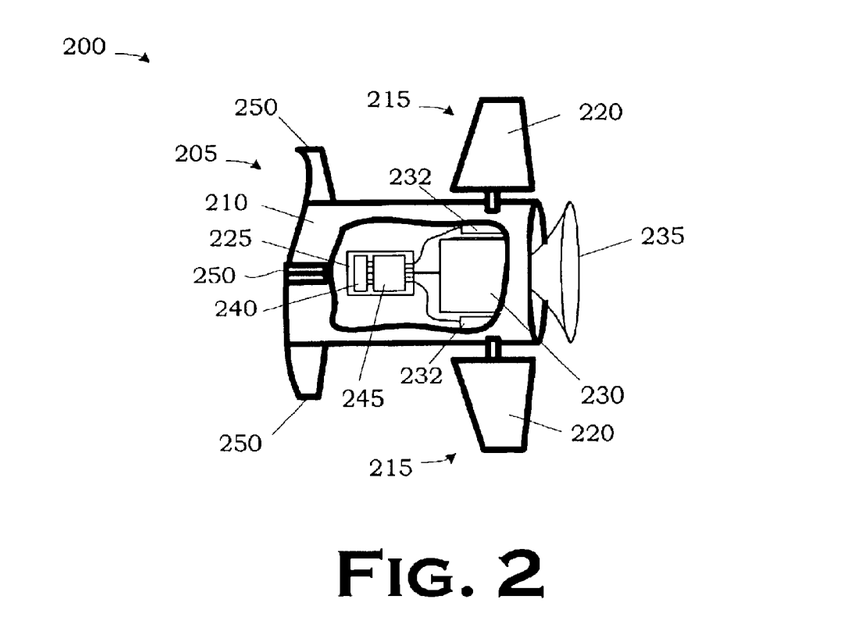
FIG. 2 depicts, in partially sectioned perspective view, a portion of a flight vehicle in one particular embodiment constructed and operated in accordance with the present invention.

FIG. 2 depicts, in partially sectioned perspective view, a portion of a flight vehicle 200 in one particular embodiment constructed and operated in accordance with the present invention. The flight vehicle 200 comprises a body 205 including a fuselage 210 and a plurality of attitude control mechanisms, i.e., fins 215 including control surfaces 220 for the body 205. Note that only selected portions of the flight vehicle 200 are shown for the sake of clarity and so as not to obscure the invention. As those in the art having the benefit of this disclosure will appreciate, the flight vehicle 200 may include additional features not illustrated. Such features may include additional control surfaces, other attitude control mechanisms, a nose cone, and a payload (e.g., a warhead and/or a variety of sensors).

The fuselage 210 of the body 205 houses additional components of the flight vehicle 200, including a control unit 225, a multi-pulse motor 230, and actuators 232 for the fins 215. In the illustrated embodiment, the control unit 225 and the actuators 232 are fully housed in the fuselage 210, while the multi-pulse motor 230 is only partially housed. More particularly, the blast nozzle 235 of the multi-pulse motor 230 extends out the fuselage 210 and away from the body 205 to direct the blast (not shown) of the multi-pulse motor 230 away from the flight vehicle 200. The actuators 232 may be of any suitable type known to the art for actuating the fins 215.

Similarly, the multi-pulse motor 230 may be any suitable multi-pulse motor known to the art. As used herein, the term "multi-pulse motor" refers to a rocket motor capable of burning at least twice in a single stage. The multi-pulse motor 230 may therefore be a conventional, solid fuel rocket motor of the type commonly referred to as a "dual pulse motor" in the art. However, the multi-pulse motor 230 may also be a suitably controlled liquid-fueled motor. As those in the art having the benefit of this disclosure will appreciate, liquid-fueled motors—unlike their solid-fueled counterparts—may be burned several times if the fuel supply and ignition are properly controlled. Thus, the multi-pulse motor 230 may also be a suitably controlled liquid-fueled rocket.

The control unit 225 includes a program storage medium 240 and a computing device 245. The computing device 245 may be any suitable type of computing device known to the art. For instance, the computing device 245 may be implemented in a controller or a processor, such as a digital signal processor or a general purpose microprocessor. The program storage medium 240 may, likewise, be any suitable medium known to the art. For instance, the program storage medium 240 may be random access memory ("RAM") or read only memory ("ROM"). The technology employed also admits wide variation. If implemented in RAM, the program storage medium 240 may constitute registers, cache memory, etc. If implemented in ROM, the program storage medium 240 may be optical or magnetic, such as an optical disk or a magnetic ROM device.

The program storage medium 240 is encoded with a plurality of instructions (not shown). The computing device 245 retrieves the instructions and executes them when powered in accordance with the mission profile. The mission profile may be promulgated and encoded prior to deployment. The computing device 245, in executing the instructions, generates control signals to control the actuation of the control surfaces 220 and the multi-pulse motor 230. More particularly, the computing device 245 generates control signals to effect a maneuver dictated by the actuation of the control surfaces 220. Note that the generation, and use of these control signals will be implementation-specific, depending on the implementation of the actuators 232 and the multi-pulse motor 230. In the illustrated embodiment, the actuators 232 and multi-pulse motor 230 are off-the-shelf, conventional parts. Consequently, the generation and use of the control signals should be readily within the skill of those in the art having the benefit of this disclosure.

The flight vehicle 200, in the illustrated embodiment, is an interceptor missile. In operation, the flight vehicle 200 performs a mission profile in two phases. In the first phase, the flight vehicle 200 locates and acquires the target before entering the second phase, wherein it homes in on the target. The multi-pulse motor 230 burns its fuel (not shown) in two pulses, just as does any other dual pulse motor. However, the present invention, through the control algorithm encoded on the program storage medium 240 and executed by the computing device 245, conserves the second pulse of the burn until the second phase of the mission profile.

Figure 3:
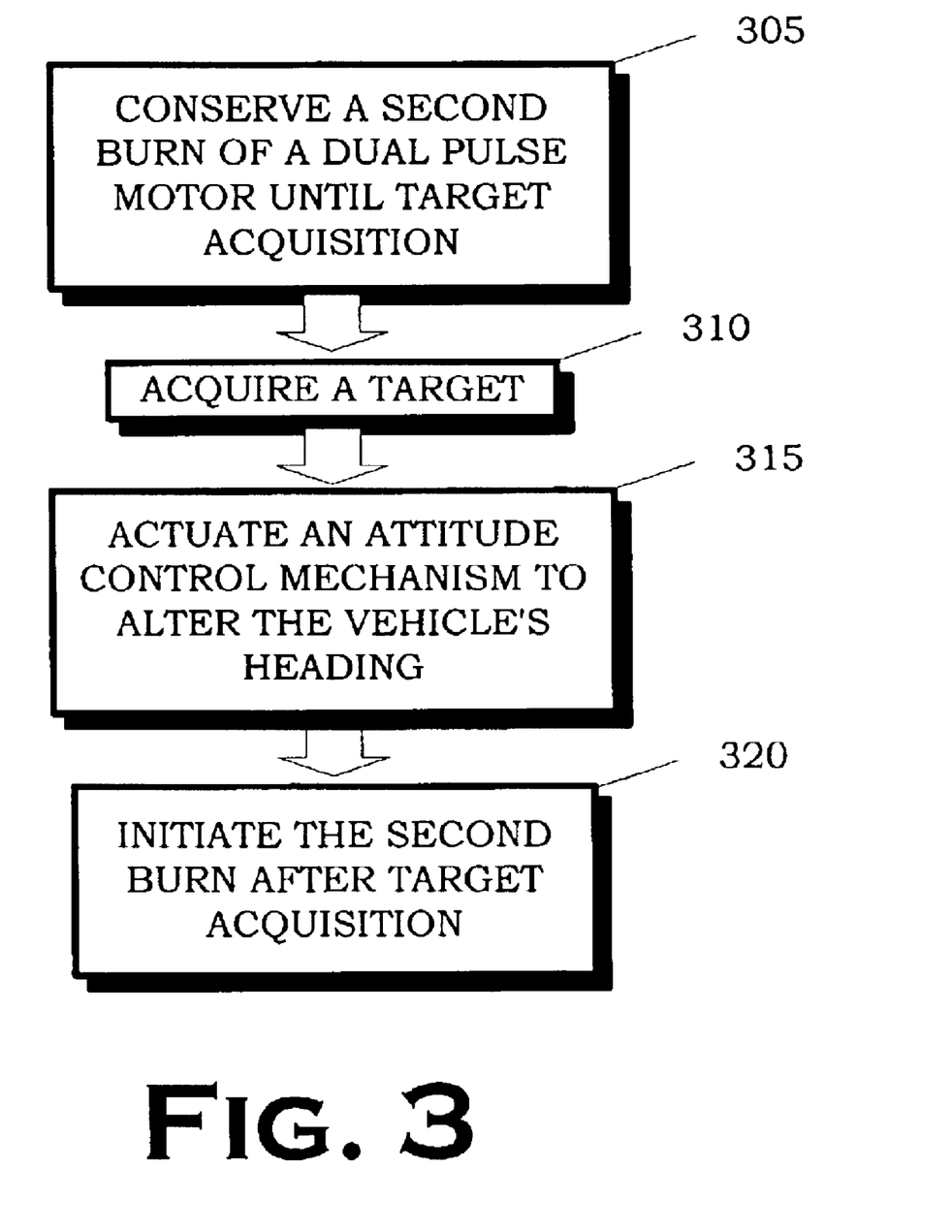
FIG. 3 illustrates one embodiment of a method practiced in accordance with the present invention.

More particularly, in the illustrated invention, the multi-pulse motor A30 is a solid-fueled, dual pulse motor. As shown in FIG. 3, the present invention begins by conserving a second burn of a multi-pulse motor 230 until target acquisition (at 305). Eventually, the flight vehicle 200 acquires a target (at 310). This conservation is performed by the control unit 225, through the execution of the software control algorithm encoded on the program storage medium 240 by the computing device 245. Target acquisition may be made by any technique known to the art. As used herein, the term "target acquisition" means location of the target by the onboard sensors of the flight vehicle 200. Furthermore, target acquisition marks the point at which the flight vehicle 200 begins "homing" on the target. As used herein, the term "homing" identifies that part of the mission that follows target acquisition.

Figure 4A:
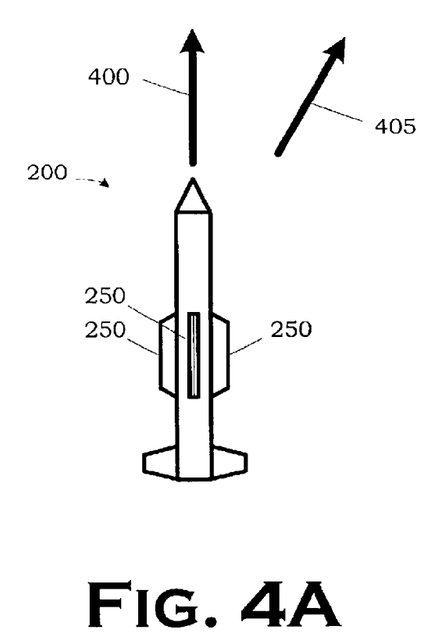
FIG. 4A to FIG. 4C depict the flight vehicle of FIG. 2 as the method of FIG. 3 is practiced.

As is shown in FIG. 4A, the flight vehicle 200 will be moving on a first flight path 400. Typically, the flight vehicle 200 will need a new flight path, e.g., the flight path 405, to intercept or strike the target. The flight vehicle 200 is shown oriented in the direction of the first flight path 400 at the time of target acquisition, but this may not always be the case. Note that there is no burn from the multi-pulse motor 230 shown in FIG. 4A.

Figure 4B:
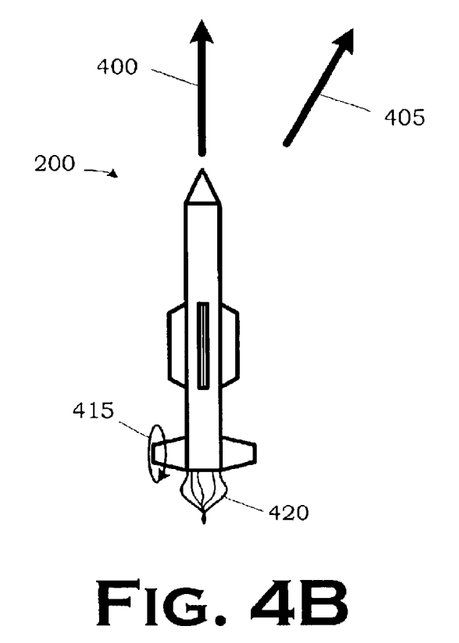

To achieve the new flight path 405, the flight vehicle 200 actuates an attitude control mechanism, e.g., a control surface 220 (at 315) for the flight vehicle 200, as indicated by the arrow 415 in FIG. 4B, to alter the current flight path 400 of the flight vehicle 200 to the new flight path 405. Although only the one control surface 220 is indicated as being actuated, any maneuver will typically include actuation of two, three, or more attitude control mechanisms. The determination of which attitude control mechanisms are actuated will depend on the combination of change in pitch, yaw, and roll needed to perform the desired maneuver. These details will be implementation specific and may be implemented in accordance with conventional practice. Note that, in some scenarios, the attitude control mechanism may already be actuated for the effectuation of a previously desired maneuver such that the attitude control mechanism may already by actuated when the target is acquired. Thus, the actuation of the attitude control mechanism (at 315) upon target acquisition does not preclude prior actuation.

The flight vehicle 200 also initiates the second burn for the multi-pulse motor 230 (at 320). Note that the initiation of the second burn is indicated in FIG. 4B and in FIG. 4C by the plume 420. The second burn generates a vectored thrust that generates a relatively large "sideways" thrust component (represented by the arrow 425 in FIG. 4C) as the heading of the flight vehicle 200 changes. The vectored thrust 425 alters the flight path of the flight vehicle 200 in the direction of the new flight path 405.

Figure 4C:
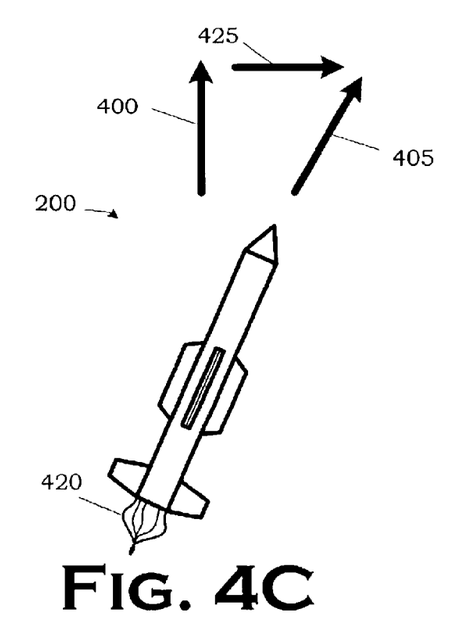

Note that the illustrated embodiment initiates the second burn not only after target acquisition, but also after actuation of the control surface 220. However, the invention is not so limited. The second burn may be initiated after target acquisition but before actuation of the control surface 220, for instance. Furthermore, the illustrated embodiment only changes the heading of the flight vehicle 200 until it is consonant with the new flight path 405. Some alternative embodiments may choose to control the heading of the flight vehicle 200 temporarily beyond the direction of the new flight path. This will generate a vectored thrust that will more quickly maneuver the flight vehicle 200 to the new flight path 405. However, the heading will need to be corrected back in a timely fashion to the new flight path 405 to prevent "overshooting" the new flight path 405.

The vectored thrust of the second burn permits the use of smaller, lighter fins 250. Although the drawings are not necessarily to scale, the difference is illustrated by comparing the size of the fins 104 relative the overall size of the flight vehicle 100 in FIG. 1 and the size of the fins 250 relative to the overall size of the flight vehicle 200 in, e.g., FIG. 4A. The invention in this embodiment consequently realizes both the speed and weight advantages of using smaller fins with the range, thermal loading, and speed advantages of dual pulse motors without incurring the complexity of using divert motors. Indeed, simulations have shown that the invention may have a relatively extraordinary beneficial impact on the maneuverability of such a flight vehicle. Furthermore, the increase in speed does not adversely affect target acquisition time since the acceleration occurs after target acquisition. Note also that, although the invention permits the use of smaller, lighter fins, this is not required. The invention may be employed with fins of conventional size in some embodiments.

Figure 5:
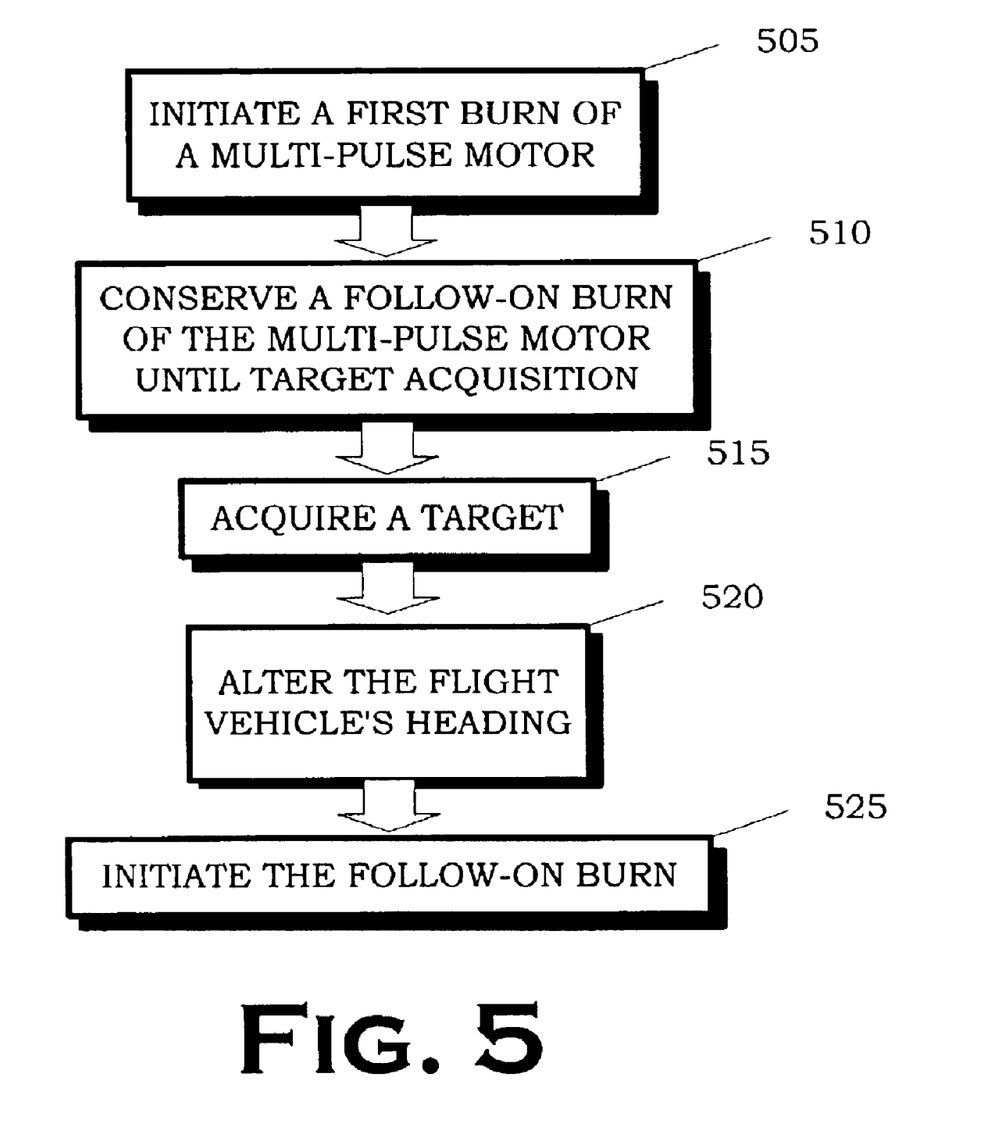
FIG. 5 illustrates a second embodiment of a method practiced in accordance with the present invention.

As was noted earlier, liquid-fueled motors may be burned several times. In theory, solid-fuel motors can also be constructed to achieve more than two burns by further segmenting the propellant supply. Thus, some embodiments might not be limited to a "first" burn and a "second burn." FIG. 5 presents a more generalized embodiment of the method in FIG. 3. In this embodiment, the method begins by initiating a first burn (at 505) and includes conserving a follow-on burn of the multi-pulse motor until target acquisition (at 510). Note that one or more intermediate burns may be initiated between the initial burn and the follow-on burn. The amount of conservation will be implementation specific, depending on anticipated needs for the mission profile. Eventually, the method includes acquiring a target (at 515); actuating an attitude control mechanism for the flight vehicle 200 to alter the flight vehicle's heading; and, initiating the follow-on burn (at 520).

Figure 6A:
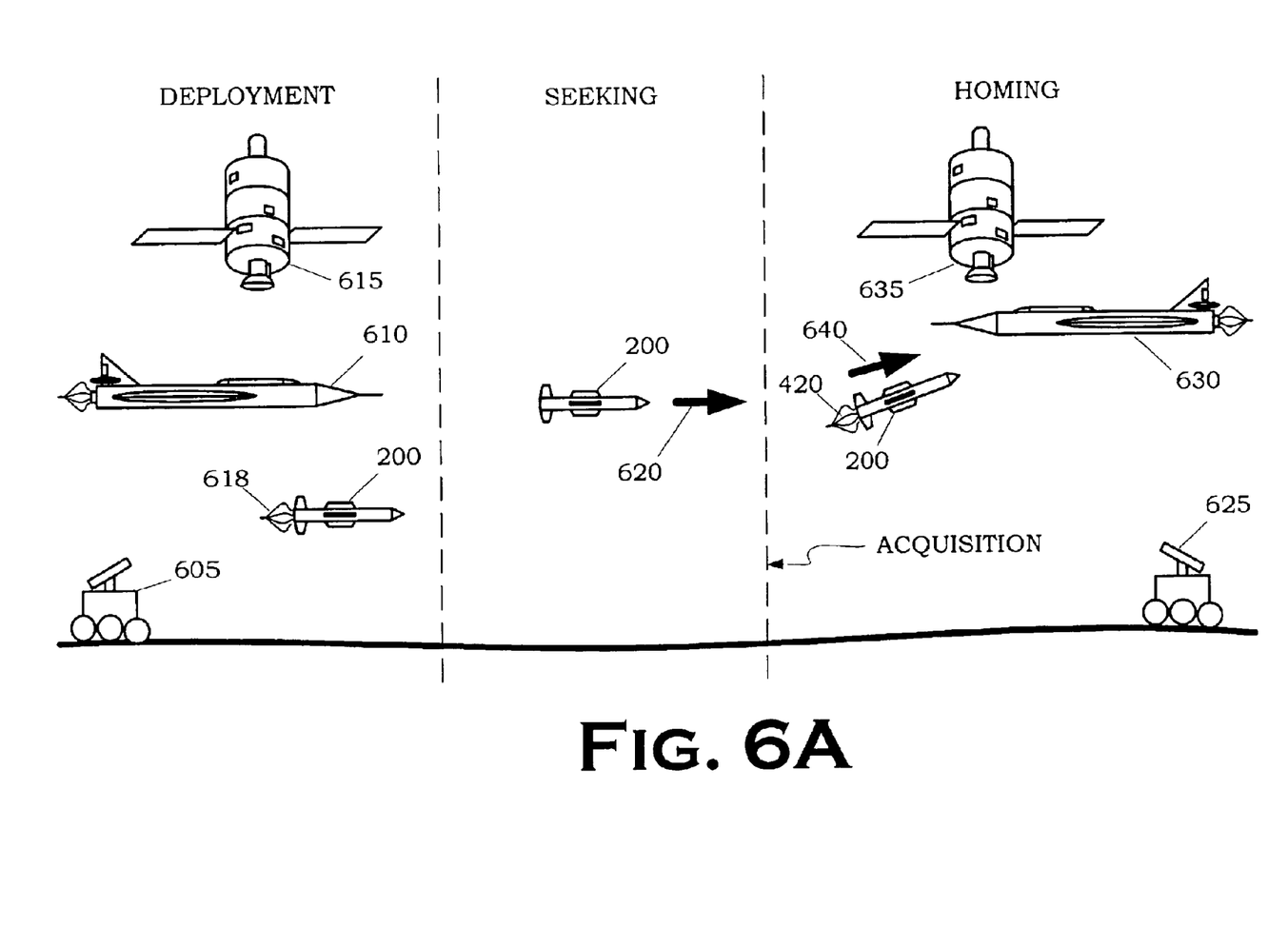
FIG. 6A and FIG. 6B illustrate one embodiment of an operational scenario in accordance with the present invention.
Figure 6B:
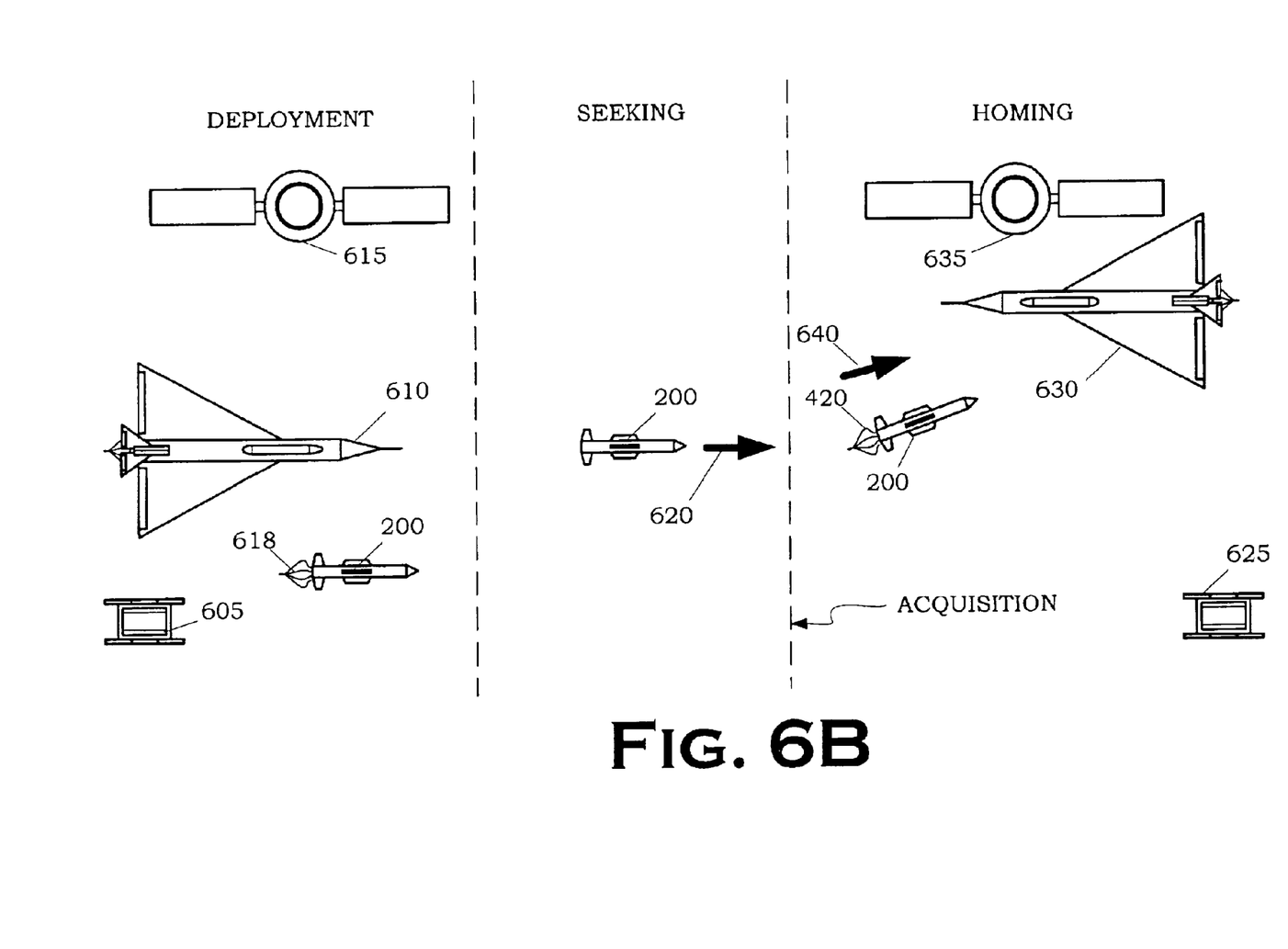

FIG. 6A and FIG. 6B illustrate one embodiment of an operational scenario in accordance with the present invention. FIG. 6A is a "side" view and FIG. 6B is a top, or "bird's eye," plan view of the same scenario. The flight vehicle 200 is shown in three phases of a mission profile for this scenario: deployment, seeking, and homing. The flight vehicle 200 may be deployed from a ground-based, airborne, or exoatmospheric vehicle such as the launcher 605, aircraft 610, or satellite 615, respectively. Upon deployment, the flight vehicle 200 initiates a first burn (see FIG. 5, at 505) represented by the plume 618. From this burn, the flight vehicle 200 attains a cruising altitude and velocity that define its flight path, represented by the arrow 620. The flight vehicle 200 then begins seeking a target. The target may be, e.g., a ground-based, airborne, or exoatmospheric vehicle such as the launcher 625, aircraft 630, and satellite 635, respectively.

The first burn will terminate during the seeking phase of the mission profile as is shown in FIG. 6A and FIG. 6B. The first burn may continue from the deployment phase into the seeking phase, and additional burns may occur during the seeking phase in some embodiments. However, the flight vehicle 200 will conserve a second, or follow-on, burn of the multi-pulse motor until target acquisition (see FIG. 5, at 510). At some point during the seeking phase, the flight vehicle 200 acquires the target (see FIG. 5, at 515).

Once the target is acquired, the flight vehicle 200 alters its heading, represented by the arrow 640, (see FIG. 5, at 520) and initiates a follow-on burn, represented by the plume 420, (see FIG. 5, at 525). Note that, in the illustrated scenario, the heading 640 of the flight vehicle 200 diverges from the flight path 620. The follow-on burn may continue until the fuel is exhausted or some fuel may be conserved for subsequent maneuvers. Either way, the flight vehicle 200 continues to home in an effort to intercept the target until either the target is successfully intercepted or the fuel is exhausted.

Some portions of the detailed descriptions herein are presented in terms of a software implemented process involving symbolic representations of operations on data bits within a memory in a computing system or a computing device. For example, the software control algorithm encoded on the program storage medium 240 in FIG. 2 and executed by the computing device 245 would be one such process. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note that the invention admits wide variation in embodiments for use in alternative operational scenarios and environments. For example, the illustrated embodiment is a missile propelled through the Earth's atmosphere, although the invention is not so limited. For instance, the invention may be applied to both endoatmospheric and exoatmospheric environments. Note that, as used herein, the term "flight vehicle" refers to any aerospace vehicle that may be used in the atmosphere and/or space. The invention may be employed in practically any penetrating weapon maneuvering after target acquisition. The invention may be therefore be employed in, for instance, a weapon in a marine environment launched from a submarine or a surface vessel.

The invention also admits variation in aspects that may be unrelated to mission scenarios and environments. For instance, in the illustrated embodiment, the control surfaces 220 actuated by the control unit 225 comprise a portion of the fins 215. However, in alternative embodiments, the control unit 225 may actuate control surfaces on the fins 250 in addition to or in lieu of the control surfaces 220 on the fins 215. Similarly, the other types of structures may be used to implement the actuated control surfaces 220, e.g., canards.

Some embodiments might omit the control surfaces 220 altogether in favor of other types of attitude control mechanisms. For instance, one particular embodiment employs a plurality of attitude control motors. These motors are, like divert motors, are essentially side-facing thruster. However, unlike divert motors that are positioned about the center of gravity of the flight vehicle, attitude control motors are positioned about, or in close proximity to, the nose and/or tail of the flight vehicle. When fired, they generate a torque about vehicle's center of gravity, alter its heading. These, and still other types of attitude control mechanisms, may be employed in addition to, or in lieu of, control surfaces.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A flight vehicle, comprising:
   a body;
   a plurality of attitude control mechanisms on the body;
   a multi-pulse motor housed at least partially in the body; and
   a control unit housed in the body, including:
      a program storage medium encoded with a plurality of instructions;
      a computing device capable of executing the instructions and generating signals controlling an actuation of the attitude control mechanisms and the multi-pulse motor to initiate a follow-on burn of the multi-pulse motor to effect a high altitude maneuver directed by the actuation of the attitude control mechanisms.

2. The flight vehicle of claim 1, wherein the flight vehicle comprises a missile.

3. The flight vehicle of claim 1, wherein the body includes a fuselage.

4. The flight vehicle of claim 1, wherein the attitude control mechanisms include a control surface or an attitude control motor.

5. The flight vehicle of claim 4, wherein the control surface is found on a fin or a canard.

6. The flight vehicle of claim 1, wherein the multi-pulse motor is a dual pulse motor.

7. The flight vehicle of claim 6, wherein the dual pulse motor is a solid-fueled motor.

8. The flight vehicle of claim 1, wherein the multi-pulse motor is a liquid-fueled motor.

9. The flight vehicle of claim 1, wherein the program storage medium comprises a random access memory or a read-only memory.

10. The flight vehicle of claim 1, wherein the program storage medium comprises a magnetic program storage medium or an optical program storage medium.

11. The flight vehicle of claim 1, wherein the computing device comprises a controller or a processor.

12. An apparatus, comprising:
    a program storage medium encoded with a plurality of instructions;
    a computing device capable of executing the instructions and generating signals controlling an actuation of a flight vehicle attitude control mechanism and a dual pulse motor to actuate the dual pulse motor and effect a high altitude maneuver directed by the actuation of the attitude control mechanisms.

13. The apparatus of claim 12, wherein the program storage medium comprises a random access memory or a read-only memory.

14. The apparatus of claim 12, wherein the program storage medium comprises a magnetic program storage medium or an optical program storage medium.

15. The apparatus of claim 12, wherein the computing device comprises a controller or a processor.

16. A method for controlling a flight vehicle, comprising:
    initiating a first burn of a multi-pulse motor;
    conserving a follow-on burn of the multi-pulse motor until target acquisition;
    acquiring a target;
    altering the flight vehicle's heading; and
    initiating the follow-on burn at a high altitude.

17. The method of claim 16, further comprising deploying the flight vehicle.

18. The method of claim 16, wherein altering the flight vehicle's heading includes actuating an attitude control mechanism.

19. The method of claim 18, wherein actuating the attitude control mechanism includes actuating at least one of a control surface on a fin, actuating a control surface on a canard, and actuating an attitude control motor.

20. A method for controlling a flight vehicle, comprising:
    conserving a second one of two burns of a dual pulse motor until target acquisition;
    acquiring a target;
    actuating an attitude control mechanism for the flight vehicle to alter the flight vehicle's heading; and
    initiating the second burn at a high altitude.

21. The method of claim 20, further comprising:
    deploying the flight vehicle; and
    initiating a first burn of the dual pulse motor.

22. An apparatus for controlling a flight vehicle, comprising:
    means for initiating a first burn of a multi-pulse motor;
    means for conserving a follow-on burn of the multi-pulse motor until target acquisition;

means for acquiring a target;
means for altering the flight vehicle's heading; and
means for initiating the follow-on burn at a high altitude.

23. The apparatus of claim 22, further comprising means for deploying the flight vehicle.

24. The apparatus of claim 22, wherein the means for altering the flight vehicle's heading includes means for actuating an attitude control mechanism.

25. The apparatus of claim 24, wherein the means for actuating the attitude control mechanism includes means for actuating at least one of a control surface on a fin, actuating a control surface on a canard, and means for actuating an attitude control motor.

26. An apparatus for controlling a flight vehicle, comprising:
means for conserving a second one of two burns of a dual pulse motor until target acquisition;
means for acquiring a target;
means for actuating an attitude control mechanism for the flight vehicle to alter the flight vehicle's heading; and
means for initiating the second burn at a high altitude.

27. The apparatus of claim 26, further comprising:
means for deploying the flight vehicle; and
means for initiating a first burn of the dual pulse motor.

28. The apparatus of claim 1, wherein the high altitude maneuver comprises an exoatmospheric maneuver.

29. The apparatus of claim 1, wherein the high altitude maneuver comprises an endoatmospheric maneuver.

30. The apparatus of claim 12, wherein the high altitude maneuver comprises an exoatmospheric maneuver.

31. The apparatus of claim 12, wherein the high altitude maneuver comprises an endoatmospheric maneuver.

32. The method of claim 16, wherein the high altitude comprises an exoatmospheric altitude.

33. The method of claim 16, wherein the high altitude comprises an endoatmospheric altitude.

34. The method of claim 20, wherein the high altitude comprises an exoatmospheric altitude.

35. The method of claim 20, wherein the high altitude comprises an endoatmospheric altitude.

36. The apparatus of claim 22, wherein the high altitude comprises an exoatmospheric altitude.

37. The apparatus of claim 22, wherein the high altitude comprises an endoatmospheric altitude.

38. The apparatus of claim 26, wherein the high altitude comprises an exoatmospheric altitude.

39. The apparatus of claim 26, wherein the high altitude comprises an endoatmospheric altitude.

40. A flight vehicle, comprising:
a body;
a plurality of attitude control mechanisms on the body;
a multi-pulse motor housed at least partially in the body; and
a control unit housed in the body, including:
a program storage medium encoded with a plurality of instructions;
a computing device capable of executing the instructions and generating signals controlling an actuation of the attitude control mechanisms and the multi-pulse motor to initiate a follow-on burn of the multi-pulse motor to thrust vector the flight vehicle as directed by the actuation of the attitude control mechanisms.

41. The flight vehicle of claim 40, wherein the attitude control mechanisms include a control surface or an attitude control motor.

42. The flight vehicle of claim 40, wherein the multi-pulse motor is a dual pulse motor.

43. The flight vehicle of claim 42, wherein the dual pulse motor is a solid-fueled motor.

44. The flight vehicle of claim 40, wherein the multi-pulse motor is a liquid-fueled motor.

45. The flight vehicle of claim 40, wherein the program storage medium comprises a random access memory or a read-only memory.

46. The flight vehicle of claim 40, wherein the program storage medium comprises a magnetic program storage medium or an optical program storage medium.

47. The flight vehicle of claim 40, wherein the computing device comprises a controller or a processor.

48. An apparatus, comprising:
a program storage medium encoded with a plurality of instructions;
a computing device capable of executing the instructions and generating signals controlling an actuation of a flight vehicle attitude control mechanism and a dual pulse motor to actuate the dual pulse motor and thrust vector the flight vehicle as directed by the actuation of the attitude control mechanisms.

49. The apparatus of claim 48, wherein the program storage medium comprises a random access memory or a read-only memory.

50. The apparatus of claim 48, wherein the program storage medium comprises a magnetic program storage medium or an optical program storage medium.

51. The apparatus of claim 48, wherein the computing device comprises a controller or a processor.

52. A method for controlling a flight vehicle, comprising:
initiating a first burn of a multi-pulse motor;
conserving a follow-on burn of the multi-pulse motor until target acquisition;
acquiring a target;
altering the flight vehicle's heading; and
initiating the follow-on burn to thrust vector the flight vehicle in the direction of the flight vehicle's heading.

53. The method of claim 52, further comprising deploying the flight vehicle.

54. The method of claim 52, wherein altering the flight vehicle's heading includes actuating an attitude control mechanism.

55. The method of claim 54, wherein actuating the attitude control mechanism includes actuating at least one of a control surface on a fin, actuating a control surface on a canard, and actuating an attitude control motor.

56. A method for controlling a flight vehicle, comprising:
conserving a second one of two burns of a dual pulse motor until target acquisition;
acquiring a target;
actuating an attitude control mechanism for the flight vehicle to alter the flight vehicle's heading; and
initiating the second burn to thrust vector the flight vehicle in the direction of the flight vehicle's heading.

57. The method of claim 56, further comprising:
deploying the flight vehicle; and
initiating a first burn of the dual pulse motor.

* * * * *